(12) United States Patent
Fang et al.

(10) Patent No.: US 12,181,281 B2
(45) Date of Patent: Dec. 31, 2024

(54) POSITIONING SYSTEMS AND METHODS

(71) Applicant: ZHEJIANG DAHUA TECHNOLOGY CO., LTD., Zhejiang (CN)

(72) Inventors: Yongjun Fang, Hangzhou (CN); Guoquan Zhang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 318 days.

(21) Appl. No.: 17/656,874

(22) Filed: Mar. 28, 2022

(65) Prior Publication Data

US 2022/0221274 A1 Jul. 14, 2022

Related U.S. Application Data

(63) Continuation of application No. PCT/CN2020/120349, filed on Oct. 12, 2020.

(30) Foreign Application Priority Data

Oct. 14, 2019 (CN) .......................... 201910974491.2

(51) Int. Cl.
*G01C 11/08* (2006.01)
*G05D 1/00* (2006.01)
(Continued)

(52) U.S. Cl.
CPC ............. *G01C 11/08* (2013.01); *G05D 1/101* (2013.01); *G06T 7/70* (2017.01); *G06T 7/97* (2017.01);
(Continued)

(58) Field of Classification Search
CPC .......... G01C 11/08; G01C 3/10; G01C 21/20; G01C 21/3623; G05D 1/101; G06T 7/70;
(Continued)

(56) References Cited

U.S. PATENT DOCUMENTS 1,106,086 A * 8/1914 Dunn et al. ............. B29C 45/83
425/418
10,401,874 B1 9/2019 Acknin et al.
(Continued)

FOREIGN PATENT DOCUMENTS

CN 101701814 A 5/2010
CN 101860562 A 10/2010
(Continued)

OTHER PUBLICATIONS

International Search Report in PCT/CN2020/120349 mailed on Jan. 13, 2021, 5 pages.
(Continued)

*Primary Examiner* — Brian P Sweeney
(74) *Attorney, Agent, or Firm* — METIS IP LLC

(57) ABSTRACT

The present disclosure may provide a system for positioning a target scene and/or navigating a detection equipment to the target scene. The system may obtain at least one image captured by at least one camera. The at least one image may include the target scene. The system may also determine a position of the target scene based on the at least one image. Further, the system may plan a travelling route for a detection equipment to the target scene based on the position of the target scene.

17 Claims, 9 Drawing Sheets

(51) Int. Cl.
*G05D 1/10* (2006.01)
*G06T 7/00* (2017.01)
*G06T 7/70* (2017.01)
*G08B 19/00* (2006.01)

(52) U.S. Cl.
CPC .... *G06T 2207/30252* (2013.01); *G08B 19/00* (2013.01)

(58) Field of Classification Search
CPC . G06T 7/97; G06T 2207/30252; G08B 19/00; G08B 13/19641; G08B 13/1965; G08B 17/125; G06V 20/17; G06V 20/52; G08G 5/0013; G08G 5/0026; G08G 5/0034; G08G 5/0052; G08G 5/0069
See application file for complete search history.

(56) References Cited

U.S. PATENT DOCUMENTS

| | | |
|---|---|---|
| 2005/0125142 A1 | 6/2005 | Yamane |
| 2016/0313120 A1 | 10/2016 | Shishalov et al. |
| 2019/0179346 A1 | 6/2019 | Sasao et al. |

FOREIGN PATENT DOCUMENTS

| | | | | |
|---|---|---|---|---|
| CN | 101943580 A | | 1/2011 | |
| CN | 103017740 A | | 4/2013 | |
| CN | 103776438 A | | 5/2014 | |
| CN | 104061910 A | | 9/2014 | |
| CN | 104111059 A | | 10/2014 | |
| CN | 104655106 A | | 5/2015 | |
| CN | 104949673 A | | 9/2015 | |
| CN | 106485785 A | | 3/2017 | |
| CN | 106813649 A | * | 6/2017 | ............ G01C 11/08 |
| CN | 107343177 A | | 11/2017 | |
| CN | 107438152 A | | 12/2017 | |
| CN | 108174152 A | | 6/2018 | |
| CN | 108680143 A | | 10/2018 | |
| CN | 109191762 A | | 1/2019 | |
| CN | 109243135 A | | 1/2019 | |
| CN | 109615665 A | | 4/2019 | |
| CN | 110246175 A | | 9/2019 | |
| CN | 110296686 A | | 10/2019 | |
| JP | H10285583 A | | 10/1998 | |
| JP | 2001041745 A | | 2/2001 | |
| JP | 2019133403 A | | 8/2019 | |
| KR | 20100112304 A | | 10/2010 | |

OTHER PUBLICATIONS

Written Opinion in PCT/CN2020/120349 mailed on Jan. 14, 2021, 4 pages.
First Office Action in Chinese Application No. 201910974491.2 mailed on Jan. 6, 2021, 15 pages.
The Second Office Action in Chinese Application No. 201910974491.2 mailed on Sep. 8, 2021, 15 pages.
The Extended European Search Report in European Application No. 20876270.8 mailed on Sep. 2, 2022, 9 pages.

* cited by examiner

POSITIONING SYSTEMS AND METHODS

CROSS-REFERENCE TO RELATED APPLICATIONS

This application is a continuation of International Patent Application No. PCT/CN2020/120349, filed on Oct. 12, 2020, which claims priority to Chinese Patent Application No. 201910974491.2 filed on Oct. 14, 2019, the entire contents of each of which are hereby incorporated by reference.

TECHNICAL FIELD

The present disclosure generally relates to positioning systems and methods, and in particular, to systems and methods for determining a position of a scene using at least one camera and/or a detection equipment (e.g., an unmanned aerial vehicle (UAV)).

BACKGROUND

With the development of positioning technologies, requirements for positioning a target scene where a specific event happens with a certain positioning accuracy are improved. Therefore, it is desirable to provide systems and methods for determining a position of a target scene with relatively high accuracy.

SUMMARY

In one aspect of the present disclosure, a system may be provided. The system may include at least one storage device including a set of instructions and at least one processor in communication with the at least one storage device. When executing the set of instructions, the at least one processor may be configured to cause the system to: obtain a first image captured by a first camera and a second image captured by a second camera, both the first image and the second image including a same target scene; determine a first position of the target scene with respect to the first camera based on the first image; determine a second position of the target scene with respect to the second camera based on the second image; and determine a position of the target scene based on the first position of the target scene with respect to the first camera and the second position of the target scene with respect to the second camera.

In some embodiments, the first position of the target scene with respect to the first camera may include at least one of a first deviation direction of the target scene with respect to a reference direction, a first deviation angle of the target scene with respect to the reference direction, or a first coordinate of the target scene with respect to the first camera; or the second position of the target scene with respect to the second camera may include at least one of a second deviation direction of the target scene with respect to the reference direction, a second deviation angle of the target scene with respect to the reference direction, or a second coordinate of the target scene with respect to the second camera.

In some embodiments, to determine a position of the target scene based on the first position of the target scene with respect to the first camera and the second position of the target scene with respect to the second camera, the at least one processor may be configured to cause the system to: determine an intersection of the first deviation direction and the second deviation direction; and designate a position of the intersection as the position of the target scene.

In some embodiments, to determine a position of the target scene based on the first position of the target scene with respect to the first camera and the second position of the target scene with respect to the second camera, the at least one processor may be configured to cause the system to: designate the second coordinate of the target scene with respect to the second camera as a coordinate of the target scene.

In some embodiments, to determine a position of the target scene based on the first position of the target scene with respect to the first camera and the second position of the target scene with respect to the second camera, the at least one processor may be configured to cause the system to: determine, based on the first position and the second position, the position of the target scene using visual navigation of a detection equipment.

According to another aspect of the present disclosure, a method may be provided. The method may be implemented on a computing device including at least one processor, at least one storage medium, and a communication platform connected to a network. The method may include: obtaining a first image captured by a first camera and a second image captured by a second camera, both the first image and the second image including a same target scene; determining a first position of the target scene with respect to the first camera based on the first image; determining a second position of the target scene with respect to the second camera based on the second image; and determining a position of the target scene based on the first position of the target scene with respect to the first camera and the second position of the target scene with respect to the second camera.

In some embodiments, the first position of the target scene with respect to the first camera may include at least one of a first deviation direction of the target scene with respect to a reference direction, a first deviation angle of the target scene with respect to the reference direction, or a first coordinate of the target scene with respect to the first camera; or the second position of the target scene with respect to the second camera may include at least one of a second deviation direction of the target scene with respect to the reference direction, a second deviation angle of the target scene with respect to the reference direction, or a second coordinate of the target scene with respect to the second camera.

In some embodiments, the determining a position of the target scene based on the first position of the target scene with respect to the first camera and the second position of the target scene with respect to the second camera may include: determining an intersection of the first deviation direction and the second deviation direction; and designating a position of the intersection as the position of the target scene.

In some embodiments, the determining a position of the target scene based on the first position of the target scene with respect to the first camera and the second position of the target scene with respect to the second camera may include: designating the second coordinate of the target scene with respect to the second camera as a coordinate of the target scene.

In some embodiments, the determining a position of the target scene based on the first position of the target scene with respect to the first camera and the second position of the target scene with respect to the second camera may include: determining, based on the first position and the second position, the position of the target scene using visual navigation of a detection equipment.

In another aspect of the present disclosure, a non-transitory computer readable medium may be provided. The non-transitory computer readable medium may include executable instructions that, when executed by at least one processor, direct the at least one processor to perform a method. The method may include: obtaining a first image captured by a first camera and a second image captured by a second camera, both the first image and the second image including a same target scene; determining a first position of the target scene with respect to the first camera based on the first image; determining a second position of the target scene with respect to the second camera based on the second image; and determining a position of the target scene based on the first position of the target scene with respect to the first camera and the second position of the target scene with respect to the second camera.

In another aspect of the present disclosure, a system may be provided. The system may include at least one storage device including a set of instructions; and at least one processor in communication with the at least one storage device. When executing the set of instructions, the at least one processor may be configured to cause the system to: obtain, via at least one camera, at least one image, the at least one image including a target scene; determine, based on the at least one image, a position of the target scene; and plan, based on the position of the target scene, a travelling route for a detection equipment to the target scene.

In some embodiments, to obtain, via at least one camera, at least one image, the at least one processor may be directed to: obtain, via a first camera of the at least one camera, at least one first image including the target scene; determine whether the at least one camera includes at least one second camera within a field of view (FOV) of the first camera and being able to capture the target scene; and in response to determining that the at least one camera includes the at least one second camera, obtain, via the at least one second camera, at least one second image including the target scene.

In some embodiments, the at least one second camera may be nearer to the target scene than the first camera.

In some embodiments, to determine, based on the at least one image, a position of the target scene, the at least one processor may be directed to: determine, based on the at least one first image, a first position of the target scene with respect to the first camera; determine, based on the at least one second image, a second position of the target scene with respect to the at least one second camera; and determine, based on the first position of the target scene with respect to the first camera and the second position of the target scene with respect to the at least one second camera, the position of the target scene.

In some embodiments, to plan, based on the position of the target scene, a travelling route for a detection equipment to the target scene, the at least one processor may be directed to plan the travelling route for the detection equipment to the position of the target scene.

In some embodiments, the first position of the target scene with respect to the first camera may include a first deviation direction of the target scene with respect to a reference direction, a first deviation angle of the target scene with respect to the reference direction, or a first coordinate of the target scene with respect to the first camera; or the second position of the target scene with respect to the second camera may include at least one of a second deviation direction of the target scene with respect to the reference direction, a second deviation angle of the target scene with respect to the reference direction, or a second coordinate of the target scene with respect to the second camera.

In some embodiments, to plan, based on the position of the target scene, a travelling route for a detection equipment to the target scene, the at least one processor may be directed to: in response to determining that the at least one camera does not include the second camera, navigate the detection equipment to an initial position within an FOV of the first camera, a distance between the initial position and the position of the target scene being within a distance threshold; determine a travelling route for the detection equipment from the initial position to the position of the target scene; and navigate, using visual navigation of the detection equipment and the travelling route for the detection equipment from the initial position to the position of the target scene, the detection equipment towards the position of the target scene.

In some embodiments, to plan, based on the position of the target scene, a travelling route for a detection equipment to the target scene, the at least one processor may be directed to: in response to determining that the at least one camera does not include the second camera, determine a travelling route for the detection equipment from a position of the detection equipment to the position of the target scene; navigate, using a global positioning system (GPS) of the detection equipment, the detection equipment from the position of the detection equipment to the position of the target scene along the travelling route; and navigate, using visual navigation of the detection equipment, the detection equipment until the detection equipment reaches the target scene.

In some embodiments, the at least one processor may be directed further to: acquire, via the detection equipment, detailed information of the target scene.

In some embodiments, the target scene may include at least one of fire disaster, toxic gas, leaked oil, a traffic accident, a suspicious object, or a scene that a person has an unusual behavior.

In some embodiments, the position of the target scene may include a coordinate of the target scene.

In some embodiments, the at least one camera or the detection equipment may communicate with the at least one processor via a 5G network.

In some embodiments, the first camera may include an omnidirectional camera.

In some embodiments, the at least one second camera may be rotatable.

In some embodiments, the detection equipment may include an unmanned aerial vehicle.

In another aspect of the present disclosure, a method may be provided. The method may be implemented on a computing device including at least one processor, at least one storage medium, and a communication platform connected to a network. The method may include: obtaining, via at least one camera, at least one image, the at least one image including a target scene; determining, based on the at least one image, a position of the target scene; and plan, based on the position of the target scene, a travelling route for a detection equipment to the target scene.

In some embodiments, the obtaining, via at least one camera, at least one image may include: obtaining, via a first camera of the at least one camera, at least one first image including the target scene; determining whether the at least one camera includes at least one second camera within a field of view (FOV) of the first camera and being able to capture the target scene; and in response to determining that the at least one camera includes the at least one second camera, obtaining, via the at least one second camera, at least one second image including the target scene.

In some embodiments, the at least one second camera may be nearer to the target scene than the first camera.

In some embodiments, the determining, based on the at least one image, a position of the target scene may include: determining, based on the at least one first image, a first position of the target scene with respect to the first camera; determining, based on the at least one second image, a second position of the target scene with respect to the at least one second camera; and determining, based on the first position of the target scene with respect to the first camera and the second position of the target scene with respect to the at least one second camera, the position of the target scene.

In some embodiments, the planning, based on the position of the target scene, a travelling route for a detection equipment to the target scene may include: planning the travelling route for the detection equipment to the position of the target scene.

In some embodiments, the first position of the target scene with respect to the first camera may include a first deviation direction of the target scene with respect to a reference direction, a first deviation angle of the target scene with respect to the reference direction, or a first coordinate of the target scene with respect to the first camera; or the second position of the target scene with respect to the second camera may include at least one of a second deviation direction of the target scene with respect to the reference direction, a second deviation angle of the target scene with respect to the reference direction, or a second coordinate of the target scene with respect to the second camera.

In some embodiments, the planning, based on the position of the target scene, a travelling route for a detection equipment to the target scene may include: in response to determining that the at least one camera does not include the second camera, navigating the detection equipment to an initial position within an FOV of the first camera, a distance between the initial position and the position of the target scene being within a distance threshold; determining a travelling route for the detection equipment from the initial position to the position of the target scene; and navigating, using visual navigation of the detection equipment and the travelling route for the detection equipment from the initial position to the position of the target scene, the detection equipment towards the position of the target scene.

In some embodiments, the planning, based on the position of the target scene, a travelling route for a detection equipment to the target scene may include: in response to determining that the at least one camera does not include the second camera, determining a travelling route for the detection equipment from a position of the detection equipment to the position of the target scene; navigating, using a global positioning system (GPS) of the detection equipment, the detection equipment from the position of the detection equipment to the position of the target scene along the travelling route; and navigating, using visual navigation of the detection equipment, the detection equipment until the detection equipment reaches the target scene.

In some embodiments, the method may further include acquiring, via the detection equipment, detailed information of the target scene.

In some embodiments, the target scene may include at least one of fire disaster, toxic gas, leaked oil, a traffic accident, a suspicious object, or a scene that a person has an unusual behavior.

In some embodiments, the position of the target scene may include a coordinate of the target scene.

In some embodiments, the at least one camera or the detection equipment may communicate with the at least one processor via a 5G network.

In some embodiments, the first camera may include an omnidirectional camera.

In some embodiments, the at least one second camera may be rotatable.

In some embodiments, the detection equipment may include an unmanned aerial vehicle.

In another aspect of the present disclosure, a non-transitory computer readable medium may be provided. The non-transitory computer readable medium may include executable instructions that, when executed by at least one processor, direct the at least one processor to perform a method. The method may include: obtaining, via at least one camera, at least one image, the at least one image including a target scene; determining, based on the at least one image, a position of the target scene; and plan, based on the position of the target scene, a travelling route for a detection equipment to the target scene.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein.

DETAILED DESCRIPTION

Figure 1:
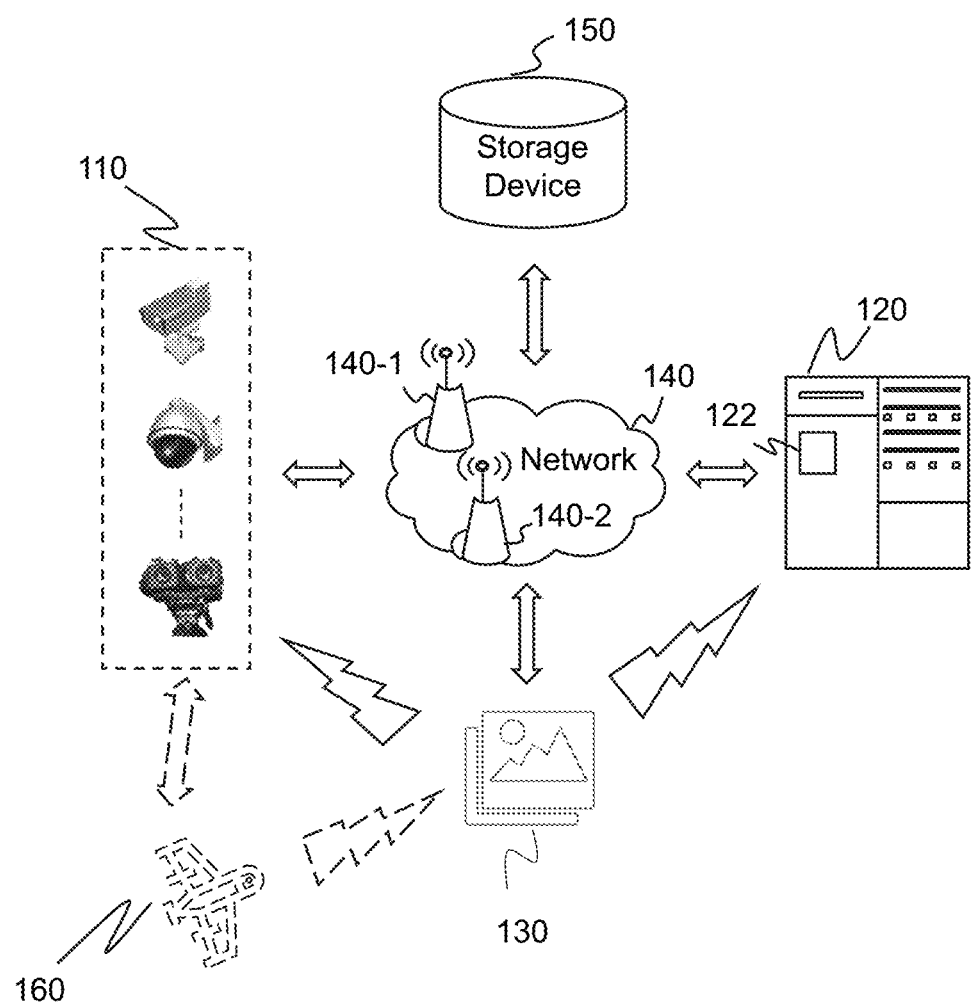
FIG. 1 is a schematic diagram illustrating an exemplary positioning system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof. The terms "unmanned aerial vehicle (UAV)," "drone," "unmanned aerial vehicle system (UAVS)" or "unmanned aerial system (UAS)" may be used interchangeably.

It will be understood that the terms "system," "unit," "module," and/or "block" used herein are one method to distinguish different components, elements, parts, sections or assemblies of different levels in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage devices. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for determining a position (e.g., a coordinate) of a target scene based on a first image captured by a first camera (e.g., an omnidirectional camera) and a second image captured by a second camera (e.g., a rotatable camera). The second camera may be within a field of view (FOV) of the first camera and be nearer to the target scene than the first camera. For example, the first position may include a first deviation direction of the target scene with respect to a reference direction, and the second position may include a second deviation direction of the target scene with respect to the reference direction. The systems may designate a position (e.g., a coordinate) of an intersection of the first deviation direction and the second deviation direction as the position of the target scene.

Another aspect of the present disclosure relates to systems and methods for planning a traveling route for a detection equipment (e.g., an unmanned aerial vehicle (UAV)) to a target scene based on at least one image captured by at least one camera. Each of the at least one image may be captured by a distinctive camera and may include position information of the target scene with respect to the corresponding camera. The systems may determine a position of the target scene based on the at least one image. The accuracy of the determined position of the target scene may relate to a count of the at least one camera. For example, the position of the target scene determined simply based on one image captured by one camera may be less accurate than that determined based on two or more images captured by different cameras. If the accuracy of the determined position of the target scene is poor or deemed poor, in order to accurately navigate the detection equipment to the target scene, the systems may navigate the detection equipment based on a planned traveling route of the detection equipment with the assistance of visual navigation of the detection equipment. If the accuracy of the determined position of the target scene is high or deemed high, the systems may directly navigate the detection equipment to the position of the target scene from the current position of the detection equipment.

FIG. 1 is a schematic diagram illustrating an exemplary positioning system according to some embodiments of the present disclosure. In some embodiments, the positioning system 100 may include at least one camera 110, a server 120, a network 140, and a storage device 150. In some embodiments, the positioning system 100 may be configured to determine a position of a target scene 130 (e.g., fire disaster) that a user of the positioning system 100 desires to capture.

The at least one camera 110 may be configured to capture at least one image including the target scene 130. In some embodiments, the camera(s) 110 may be grouped into different layers ranking from the highest layer to the lowest layer. Optionally, the grouping of the cameras may be dynamic. A camera in a lower layer may be within a field of view (FOV) of a camera in a higher layer and may be nearer to the target scene 130 than the camera in a higher layer. In such cases, the target scene 130 may be captured by the camera(s) 110 in different layers with different perspectives and at different distances with respect to the target scene 130. Merely by way of example, a count of layers of the cameras may include one, two, three, etc. In some embodiments, each layer of cameras may include at least one camera, for example, one, two, three, etc.

In some embodiments, the at least one image may be used to determine a position of the target scene 130. The accuracy of the determined position of the target scene 130 may relate to the count of layer(s) of the cameras used to capture the target scene. For example, the position of the target scene 130 determined simply based on one image captured by one camera may be less accurate than that determined based on two or more images captured by different cameras. In some embodiments, if the accuracy of the determined position of the target scene is poor or deemed poor, in order to improve the accuracy of the positioning of the target scene 130, the positioning system 100 may further update the position of the target scene 130 using visual navigation of a detection equipment 160 (e.g., an unmanned equipment, a manned equipment) that is navigated towards the target scene 130. For example, the detection equipment 160 may include a helicopter, a multicopter, a fixed-wing aircraft, a jet aircraft, a ducted fan aircraft, a lighter-than-air dirigible (e.g., a blimp or steerable balloon), a tail-sitter aircraft, a glider aircraft, an ornithopter, etc. More descriptions of determining and/or updating the position of the target scene 130 may be found elsewhere in the present disclosure, for example, FIGS. 4-6 and the descriptions thereof.

In some embodiments, the camera(s) 110 may include a multi-view camera (e.g., an omnidirectional camera), a thermographic camera (e.g., an omnidirectional thermal camera), a box camera, a gun camera, a dome camera, an integrated camera, a monocular camera, a binocular camera, a multi-sensor camera, or the like, or any combination thereof. In some embodiments, the camera(s) 110 may be rotatable. For example, a camera in the highest layer may be an omnidirectional camera or a thermographic camera, and another camera in a lower layer may be a camera of other types (e.g., a rotatable camera). It should be noted that the above descriptions may be non-limiting. For example, the at least one image may be captured by a video recorder, an image sensor, a smartphone, a tablet computer, a laptop computer, a wearable device, or the like, or any combination thereof. The video recorder may include a PC digital video recorder (DVR), an embedded DVR, or the like, or any combination thereof. The image sensor may include a charge coupled device (CCD), a complementary metal oxide semiconductor (CMOS), or the like, or any combination thereof.

The server 120 may be a single server or a server group. The server group may be centralized or distributed (e.g., the server 120 may be a distributed system). In some embodiments, the server 120 may be local or remote. For example, the server 120 may access information and/or data stored in the camera(s) 110 and/or the storage device 150 via the network 140. As another example, the server 120 may be directly connected to the camera(s) 110 and/or the storage device 150 to access stored information and/or data. In some embodiments, the server 120 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 120 may be implemented on a computing device 200 including one or more components illustrated in FIG. 2 of the present disclosure.

In some embodiments, the server 120 may include a processing device 122. The processing device 122 may process information and/or data associated with position information to perform one or more functions described in the present disclosure. For example, the processing device 122 may determine a position of the target scene 130 based on at least one image captured by the camera(s) 110. As another example, the processing device 122 may determine a position of the target scene 130 based on at least one image captured by the camera(s) 110 and visual navigation of the detection equipment 160. As a further example, the processing device 122 may plan a traveling route for the detection equipment 160 to a position of the target scene 130. In some embodiments, the processing device 122 may include one or more processing engines (e.g., single-core processing engine(s) or multi-core processor(s)). Merely by way of example, the processing device 122 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, the server 120 may be connected to the network 140 to communicate with one or more components (e.g., the camera(s) 110, the storage device 150, the detection equipment 160) of the positioning system 100. In some embodiments, the server 120 may be directly connected to or communicate with one or more components (e.g., the camera(s) 110, the storage device 150, the detection equipment 160) of the positioning system 100.

The network 140 may facilitate exchange of information and/or data. In some embodiments, the network 140 may be any type of wired or wireless network, or combination thereof. Merely by way of example, the network 140 may include a mobile network (e.g., 5G network, 4G network, 3G network, 2G network), a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 140 may include one or more network access points. For example, the network 140 may include wired or wireless network access points (e.g., a point 140-1, a point 140-2), through which one or more components of the positioning system 100 may be connected to the network 140 to exchange data and/or information.

In some embodiments, one or more components (e.g., the camera(s) 110, the server 120, the storage device 150, the detection equipment 160) of the positioning system 100 may transmit information and/or data to other component(s) of the positioning system 100 via the network 140. For example, the camera(s) 110 may communicate with the server 120 via the network 140 (e.g., 5G network) and the server 120 may obtain at least one image captured by the camera(s) 110 via the network 140 (e.g., 5G network). As another example, the detection equipment 160 may communicate with the server 120 via the network 140 (e.g., 5G network) and the server 120 may obtain at least one image of the target scene 130 captured by the detection equipment 160 via the network 140 (e.g., 5G network).

The storage device 150 may store data and/or instructions. In some embodiments, the storage device 150 may store data obtained from the camera(s) 110, the server 120, the detection equipment 160, an external storage device, etc. For example, the storage device 150 may store a position of the target scene 130 and/or a traveling route for the detection equipment 160 determined by the server 120. In some embodiments, the storage device 150 may store data and/or instructions that the server 120 may execute or use to perform exemplary methods described in the present disclosure. For example, the storage device 150 may store instructions that the positioning system 100 may execute or use to determine a position of the target scene 130 based on at least one image captured by the camera(s) 110. As another example, the storage device 150 may store instructions that the positioning system 100 may execute or use to plan a traveling route for the detection equipment 160 to the target scene 130.

In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 140 to communicate with one or more components (e.g., the camera(s) 110, the server 120, the detection equipment 160) of the positioning system 100. One or more components of the positioning system 100 may access the data or instructions stored in the storage device 150 via the network 140. In some embodiments, the storage device 150 may be directly connected to or communicate with one or more components (the camera(s) 110, the server 120, the detection equipment 160) of the positioning system 100. In some embodiments, the storage device 150 may be part of the server 120. For example, the storage device 150 may be integrated into the server 120.

It should be noted that the positioning system 100 is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure.

Figure 2:
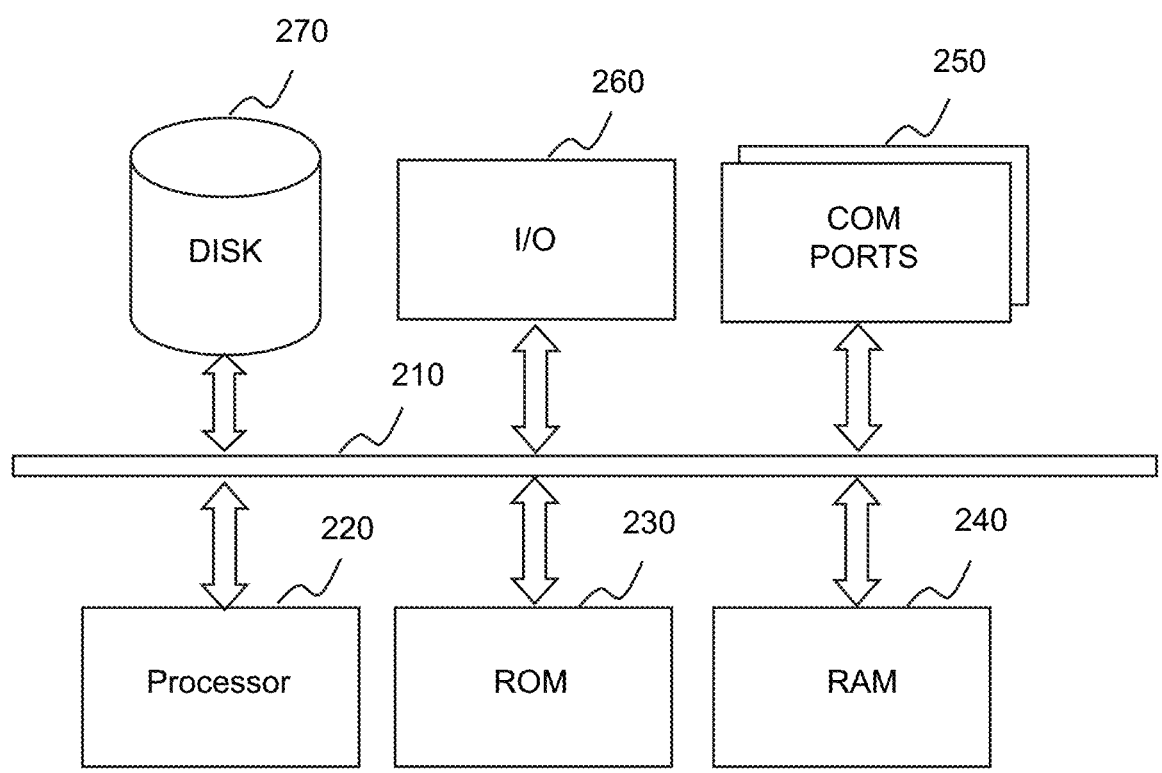
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. The computing device 200 may be used to implement any component of the positioning system 100 as described herein. For example, the processing device 122 may be implemented on the computing device 200, via its hardware, software program, firmware, or a combination thereof. Although only one such computer is shown, for convenience, the computer functions relating to position information as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include one or more storages configured to store various data files (e.g., program instructions) to be processed and/or transmitted by the computing device 200. In some embodiments, the one or more storages may include a high speed random access memory (not shown), a non-volatile memory (e.g., a magnetic storage device, a flash memory, or other non-volatile solid state memories) (not shown), a disk 270, a read-only memory (ROM) 230, or a random-access memory (RAM) 240, or the like, or any combination thereof. In some embodiments, the one or more storages may further include a remote storage corresponding to the processor 220. The remote storage may connect to the computing device 200 via the network 140. The computing device 200 may also include program instructions stored in the one or more storages (e.g., the ROM 230, RAM 240, and/or another type of non-transitory storage medium) to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both operation A and operation B, it should be understood that operation A and operation B may also be performed by two different processors 220 jointly or separately in the computing device 200 (e.g., a first processor executes operation A and a second processor executes operation B, or the first and second processors jointly execute operations A and B).

Figure 3:
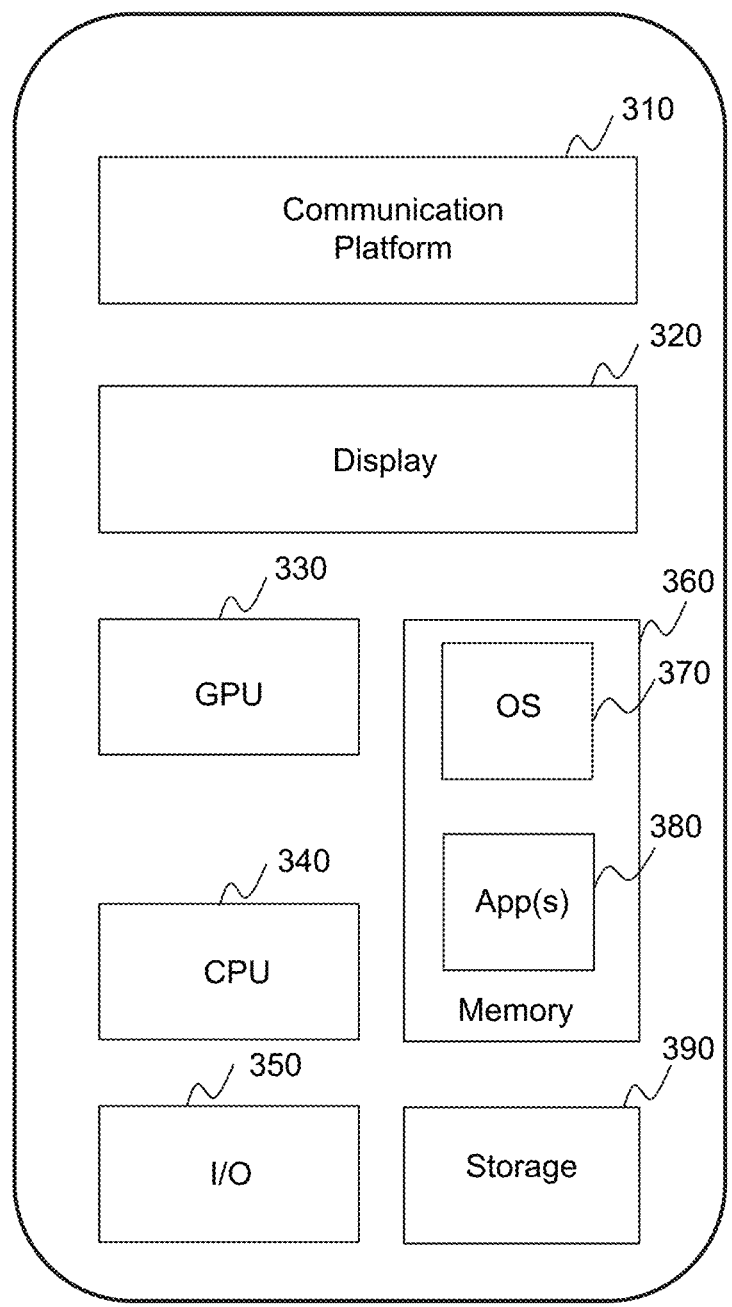
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the server 120 (e.g., the processing device 122) or the user device may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, a mobile operating system (OS) 370, and a storage 390. In some embodiments, any other suitable components, including but not limited to a system bus or a controller (not shown), may also be in the mobile device 300.

In some embodiments, the mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to position information or other information from the positioning system 100. User interactions with the information stream may be achieved via the I/O 350 and provided to the processing device 122 and/or other components of the positioning system 100 via the network 140.

Figure 4:
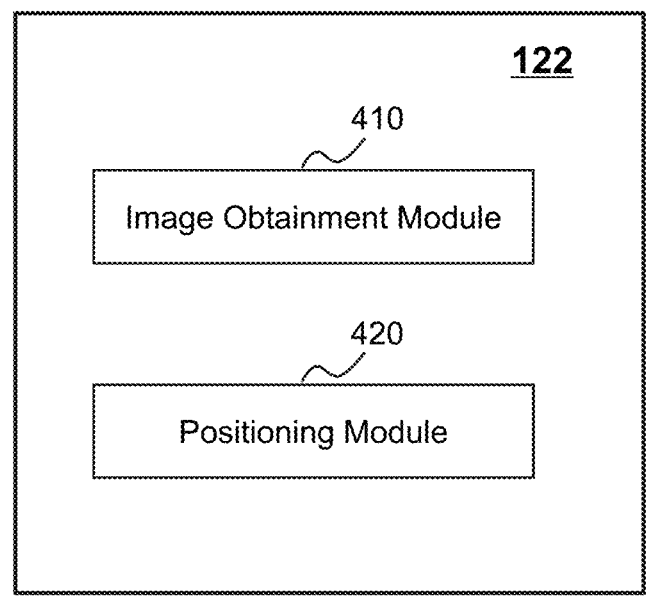
FIG. 4 is a block diagram illustrating an exemplary processing device according to some embodiments of the present disclosure.

FIG. 4 is a block diagram illustrating an exemplary processing device according to some embodiments of the present disclosure. The processing device 122 may include an image obtainment module 410 and a positioning module 420.

The image obtainment module 410 may be configured to obtain at least one image captured by at least one camera. The at least one image may include a target scene that a user of the system 100 desires to capture. In some embodiments, the at least one camera may include at least one layer of cameras. For different layers, a lower layer of cameras may be within a field of view (FOV) of a higher layer of cameras and be nearer to the target scene than the higher layer of cameras. Each layer of cameras may include at least one camera and a count of the at least one camera may include one, two, three, etc.

In some embodiments, when a first layer of cameras (e.g., a first camera) capture at least one first image including the target scene, the image obtainment module 410 may determine whether the at least one camera includes a second layer of cameras (e.g., at least one second camera) that is within an FOV of the first layer of cameras and is able to capture the target scene. In response to determining that the at least one camera does not include the at least one second camera, the image obtainment module 410 may determine that the at least one camera may only include the first camera and the at least one image may only include the at least one first image. In response to determining that the at least one camera includes the at least one second camera, the image obtainment module 410 may obtain at least one second image captured by the second layer of cameras. Accordingly, the at least one camera may include the first camera and the at least one second camera and the at least one image may include the at least one first image and the at least one second image.

In some embodiments, the image obtainment module 410 may further determine whether the at least one camera includes other (lower) layers of cameras based on the process described above. For example, the image obtainment module 410 may determine whether the at least one camera includes a third layer of cameras (e.g., at least one third camera) within an FOV of the second layer of cameras and being able to capture the target scene. In response to determining that the at least one camera includes the third layer of cameras, the image obtainment module 410 may obtain at least one third image captured by the third layer of cameras. Accordingly, the at least one camera may include the first camera, the at least one second camera, and the at least one third camera and the at least one image may include the at least one first image, the at least one second image, and the at least one third image.

The positioning module 420 may be configured to determine a position of a target scene based on the at least one image. Assuming that the at least one layer of cameras includes n layers of cameras, and a camera in the $i^{th}$ layer is within an FOV of a camera in the $(i-1)^{th}$ layer, wherein n and i are integers larger than or equal to 1. The positioning module 420 may determine a position of the target scene with respect to each layer of cameras. For example, a position of the target scene with respect to the $i^{th}$ layer of cameras may include an $i^{th}$ deviation direction of the target scene with respect to a reference direction (e.g., the north, the east, the south, the west), an $i^{th}$ deviation angle of the target scene with respect to the reference direction, an $i^{th}$ coordinate of the target scene with respect to the $i^{th}$ layer of cameras, etc.

In some embodiments, the positioning module 420 may designate a position of an intersection of an $n^{th}$ deviation direction of the target scene with respect to the reference direction and an $(n-1)^{th}$ deviation direction of the target scene with respect to the reference direction as the position of the target scene. In some embodiments, the positioning module 420 may designate an $n^{th}$ coordinate of the target scene with respect to the $n^{th}$ layer of cameras as the position of the target scene. More descriptions of determining the position of the target scene based on the at least one image may be found elsewhere in the present disclosure, for example, FIGS. 5 and 6 and the descriptions thereof.

The processing device 122 may include a navigation module (not shown in FIG. 1) configured to plan a traveling route for a detection equipment (e.g., the detection equipment 160 illustrated in FIG. 1) (e.g., a UAV) to the target scene based on the position of the target scene. In some embodiments, the navigation module may plan the traveling route for the detection equipment to the position of the target scene and then navigate the detection equipment to the position of the target scene along the traveling route. In some embodiments, as described in connection with FIG. 1, the accuracy of the position of the target scene determined by the positioning module 420 may relate to the count of layer(s) of the at least one camera. If the count of the layer(s) of cameras is smaller than a count threshold (e.g., two, three), the accuracy of the position of the target scene determined by the positioning module 420 may be poor or deemed poor. In order to improve the accuracy of the position of the target scene, the navigation module may use visual navigation of the detection equipment (e.g., the UAV) to update the position of the target scene or assist the navigation. The accuracy of the updated position may be higher than the accuracy of the position of the target scene determined by the positioning module 420.

In some embodiments, the navigation module may navigate the detection equipment to an initial position within an FOV of the first camera and then navigate the detection equipment using the visual navigation of the detection equipment until the detection equipment reaches the updated position of the target scene. In some embodiments, the navigation module may navigate the detection equipment to the position of the target scene determined by the positioning module 420 and then navigate the detection equipment using the visual navigation of the detection equipment until the detection equipment reaches the updated position of the target scene. More descriptions of planning the traveling route for the detection equipment to the target scene may be found elsewhere in the present disclosure, for example, FIGS. 5 and 6 and the descriptions thereof.

The modules in the processing device 122 may be connected to or communicated with each other via a wired connection or a wireless connection. The wired connection may include a metal cable, an optical cable, a hybrid cable, or the like, or any combination thereof. The wireless connection may include a mobile network (e.g., 2G network, 3G network, 4G network, 5G network), a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units.

Figure 5:
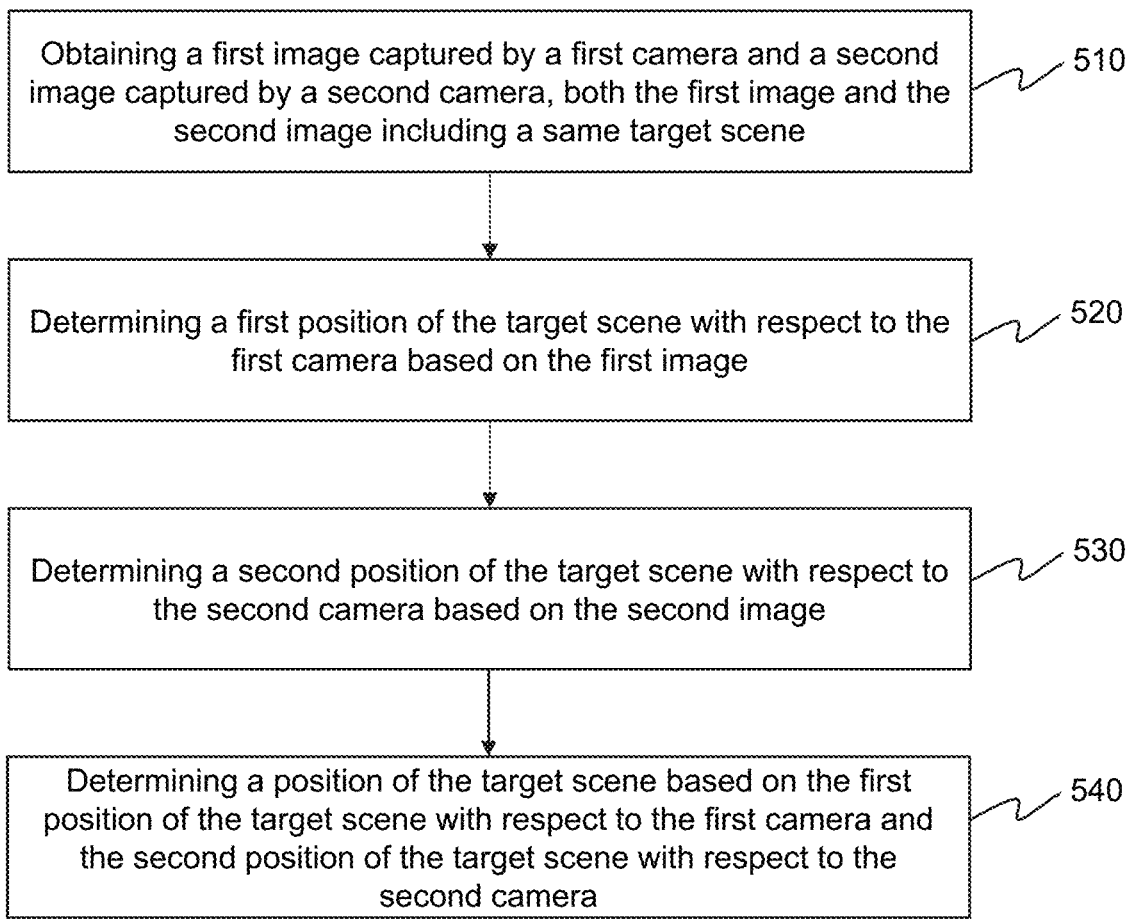
FIG. 5 is a flowchart illustrating an exemplary process for determining a position of a target scene according to some embodiments of the present disclosure.

FIG. 5 is a flowchart illustrating an exemplary process for determining a position of a target scene according to some embodiments of the present disclosure. In some embodiments, the process 500 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process are illustrated in FIG. 5 and described below is not intended to be limiting.

In 510, the processing device 122 (e.g., the image obtainment module 410) (e.g., the interface circuits of the processor 220) may obtain a first image (e.g., an omnidirectional image, an omnidirectional thermal image) captured by a first camera (e.g., a camera 810 illustrated in FIG. 8) (e.g., a multi-view camera (e.g., an omnidirectional camera, an omnidirectional camera)) and a second image captured by a second camera (e.g., a camera 820 illustrated in FIG. 8) (e.g., a rotatable camera). Merely by way of example, the first camera and the second camera may be two of the camera(s) 110 illustrated in FIG. 1. As used herein, both the first image and the second image may include a same target scene (e.g., the target scene illustrated in FIG. 1) that a user of the system 100 desires to capture. For example, the target scene may include fire disaster, toxic gas, leaked oil, a traffic accident, a suspicious object, a scene that a person has an unusual behavior (e.g., suddenly falling down due to illness (e.g., a heart attack)), etc. In some embodiments, a position of the target scene may be time-dependent, i.e., the position of the target scene changes with time. For example, since fire may spread or burn down, a position of the fire disaster may change with time. In some embodiments, a position of the target scene may be time-independent, i.e., the position of the target scene rarely changes with time. For example, a position of a traffic accident may remain the same for a while.

In some embodiments, the second camera may be within a field of view (FOV) (e.g., 60 degrees) of the first camera. The processing device 122 may first identify the first camera that captures the target scene, and then determine the second camera based on the FOV of the first camera. In such cases, the first camera may be regarded as in a higher layer than the second camera. In some embodiments, the processing device 122 may obtain one or more images captured by one or more cameras within the FOV of the first camera and designate a camera that can also capture the target scene as the second camera. In some embodiments, the processing device 122 may divide the FOV of the first camera into one or more sections. The processing device 122 may first identify the second camera within one of the one or more sections based on the process for determining the one or more cameras within the FOV of the first camera illustrated above. In response to determining that the section includes at least one camera that can capture the target scene, the processing device 122 may designate one of the at least one camera that can capture the target scene as the second camera and terminate the identification. In response to determining that the section does not include the at least one camera that can capture the target scene, the processing device 122 may identify another section of the one or more sections until the second camera is identified. In some embodiments, the processing device 122 may also identify other cameras according to a similar process for identifying the second camera illustrated above. For example, the processing device 122 may identify a third camera that is within an FOV of the second camera and is able to capture the target scene. In such cases, the second camera may be regarded as in a higher layer than the third camera.

In 520, the processing device 122 (e.g., the positioning module 420) (e.g., the processing circuits of the processor 220) may determine a first position of the target scene with respect to the first camera based on the first image. For example, the first position of the target scene may include a first deviation direction (e.g., a direction $L_1$ illustrated in FIG. 8) of the target scene with respect to a reference direction (e.g., a direction L illustrated in FIG. 8) (e.g., the north, the east, the south, the west), a first deviation angle (e.g., α illustrated in FIG. 8) of the target scene, a first coordinate of the target scene with respect to the first camera, etc. As used herein, the first deviation direction may extend from the position (e.g., a coordinate) of the first camera towards the target scene, and the first deviation angle may refer to an angle between the first deviation direction and the reference direction.

In some embodiments, the first camera may adjust its pose (e.g., the position, the direction) such that the target scene appears at the center of the first image. In such cases, the first deviation angle of the target scene with respect to the reference direction may be equal to a deviation angle of the first camera with respect to the reference direction. It should be noted that the above descriptions may be non-limiting. In some embodiments, the first position of the target scene with respect to the first camera may be calculated by the first camera and the processing device 122 may obtain the first position of the target scene with respect to the first camera from the first camera.

In 530, the processing device 122 (e.g., the positioning module 420) (e.g., the processing circuits of the processor 220) may determine a second position of the target scene with respect to the second camera based on the second image. Similar to the first position, the second position of the target scene may include a second deviation direction (e.g., a direction $L_2$ illustrated in FIG. 8) of the target scene with respect to the reference direction, a second deviation angle (e.g., (illustrated in FIG. 8) of the target scene, a second coordinate of the target scene with respect to the second camera, etc. As used herein, the second deviation direction may extend from the position (e.g., a coordinate) of the second camera towards the target scene, and the second deviation angle may refer to an angle between the second deviation direction and the reference direction.

Similar to the first camera, the second camera may adjust its pose (e.g., the position, the direction) such that the target scene appears at the center of the second image. In such cases, the second deviation angle of the target scene with respect to the reference direction may be equal to a deviation angle of the second camera with respect to the reference direction. It should be noted that the above descriptions may be non-limiting. In some embodiments, the second position of the target scene with respect to the second camera may be calculated by the second camera and the processing device 122 may obtain the second position of the target scene with respect to the second camera from the first camera.

In 540, the processing device 122 (e.g., the positioning module 420) (e.g., the processing circuits of the processor 220) may determine a position (e.g., a coordinate) of the target scene based on the first position of the target scene with respect to the first camera and the second position of the target scene with respect to the second camera. In some embodiments, the processing device 122 may determine an intersection between the first deviation direction and the second deviation direction and designate a position (e.g., a coordinate) thereof as the position of the target scene. In some embodiments, the processing device 122 may determine an average value of the first coordinate of the target scene and the second coordinate of the target scene, and designate the average value as the position of the target scene. In some embodiments, since the second camera may be nearer to the target scene than the first camera, the accuracy of the second coordinate of the target scene with respect to the second camera may be higher than the accuracy of the first coordinate of the target scene with respect to the first camera. The processing device 122 may give different weights to the first coordinate and the second coordinate (e.g., give more weight to the second coordinate) in determining the position of the target scene. Merely by way of example, the processing device 122 may directly designate the second coordinate of the target scene as the position of the target scene, which is more accurate than using only the first camera to determine the position of the target scene.

In some embodiments, in order to further improve the positioning accuracy of the target scene, the processing device 122 may use visual navigation of a detection equipment (e.g., the detection equipment 160 illustrated in FIG. 1) (e.g., an unmanned vehicle (UAV)) to dynamically update the positioning of the target scene. In some embodiments, the processing device 122 may obtain the third image captured by the third camera that is within the FOV of the second camera and is able to capture the target scene. As described above, the third camera may be nearer to the target scene than the second camera, and may be regarded as in the lower layer than the second camera. The processing device 122 may determine a third position (e.g., a third deviation direction of the target scene with respect to the reference direction, a third deviation angle of the target scene with respect to the reference direction, a third coordinate of the target scene with respect to the third camera) of the target scene with respect to the third camera based on the third image. Then, the processing device 122 may designate a position of an intersection of the second deviation direction and the third deviation direction as the position of the target scene. Alternatively, since the third camera may be nearer to the target scene than the second camera and the first camera, the processing device 122 may designate the third coordinate of the target scene with respect to the third camera as the coordinate of the target scene.

As described above, the target scene may be time-dependent, the processing device 122 may update the position of the target scene at regular or irregular intervals, thereby determining the most updated position of the target scene. It should be noted that the above descriptions may be non-limiting and a count of the first camera, the first image, the second camera, the second image, the third camera, or the third image may vary according to practical demands.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 6:
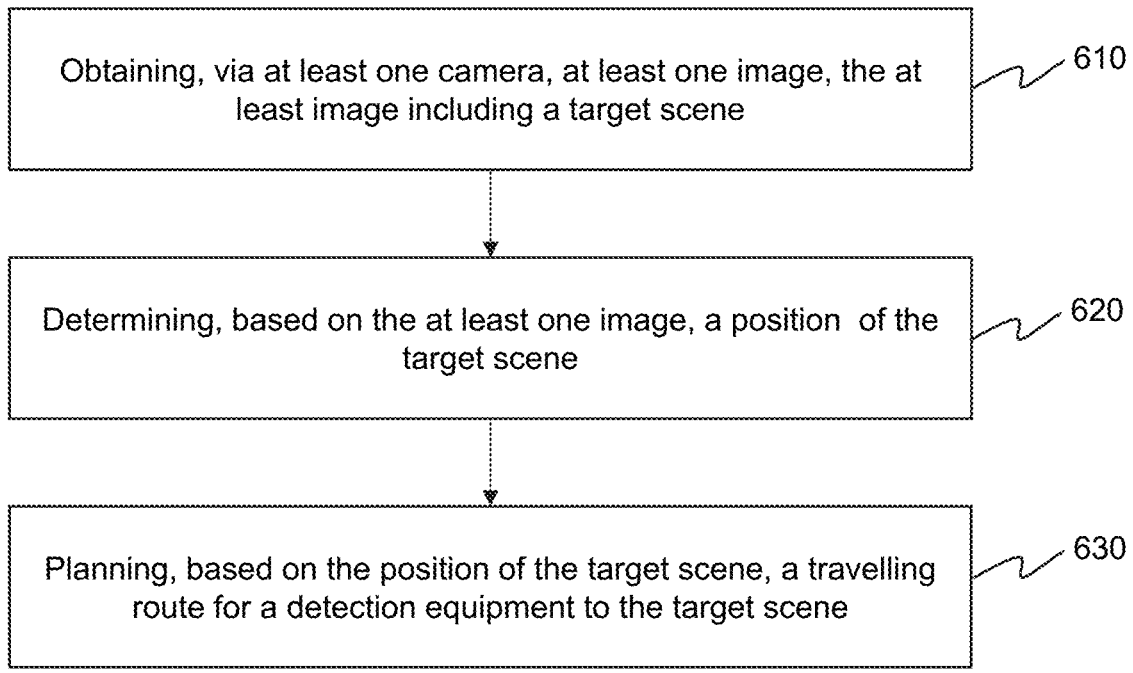
FIG. 6 is a flowchart illustrating an exemplary process for navigating a detection equipment to a target scene according to some embodiments of the present disclosure.

FIG. 6 is a flowchart illustrating an exemplary process for navigating a detection equipment to a target scene according to some embodiments of the present disclosure. In some embodiments, the process 600 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 600. The operations of the illustrated process presented below are intended to be illustrative. In some embodiments, the process 600 may be accomplished with one or more additional operations not described and/or without one or more of the operations herein discussed. Additionally, the order in which the operations of the process are illustrated in FIG. 6 and described below is not intended to be limiting.

In 610, the processing device 122 (e.g., the image obtainment module 410) (e.g., the interface circuits of the processor 220) may obtain at least one image via at least one camera (e.g., the camera(s) 110 illustrated in FIG. 1). The at least one image may include a target scene that a user of the system 100 desires to capture. For example, the target scene may include fire disaster, toxic gas, leaked oil, a traffic accident, a suspicious object, a scene that a person has an unusual behavior (e.g., suddenly falling down due to illness (e.g., a heart attack)), etc. In some embodiments, the at least one image may include one or more images described in connection with FIG. 5 (e.g., the first image, the second image). More descriptions regarding the target scene and the image(s) may be found elsewhere in the present disclosure, for example, operation 510 in FIG. 5 and the descriptions thereof.

In some embodiments, the at least one camera may include at least one layer of cameras. For different layers, a lower layer of cameras may be within a field of view (FOV) of a higher layer of cameras and be nearer to the target scene than the higher layer of cameras. Each layer of cameras may include at least one camera and a count of the at least one camera may include one, two, three, etc.

In some embodiments, when a first layer of cameras (e.g., a first camera (e.g., an omnidirectional camera) capture at least one first image including the target scene, the first layer of cameras may inform the processing device 122 and/or a third party (e.g., a hospital, a fire station) of the target scene. Alternatively, the first layer of cameras may transmit the at least one first image to the processing device 122, and the processing device 122 may inform the third party of the target scene. The processing device 122 may then determine whether the at least one camera includes a second layer of cameras (e.g., at least one second camera (e.g., a rotatable camera) that is within an FOV of the first layer of cameras and is able to capture the target scene. In response to determining that the at least one camera does not include the at least one second camera, the processing device 122 may determine that the at least one camera may only include the first camera and the at least one image may only include the at least one first image. In response to determining that the at least one camera includes the at least one second camera, the processing device 122 may obtain at least one second image captured by the second layer of cameras. Accordingly, the at least one camera may include the first camera and the at least one second camera and the at least one image may include the at least one first image and the at least one second image.

In some embodiments, the processing device 122 may further determine whether the at least one camera includes other (lower) layers of cameras based on the process described above. For example, the processing device 122 may determine whether the at least one camera includes a third layer of cameras (e.g., at least one third camera) within an FOV of the second layer of cameras and being able to capture the target scene. In response to determining that the at least one camera includes the third layer of cameras, the processing device 122 may obtain at least one third image captured by the third layer of cameras. Accordingly, the at least one camera may include the first camera, the at least one second camera, and the at least one third camera and the at least one image may include the at least one first image, the at least one second image, and the at least one third image.

In 620, the processing device 122 (e.g., the positioning module 420) (e.g., the processing circuits of the processor 220) may determine a position of the target scene based on the at least one image. Assuming that the at least one layer of cameras includes n layers of cameras, and a camera in the $i^{th}$ layer is within an FOV of a camera in the $(i-1)^{th}$ layer, wherein n and i are integers larger than or equal to 1. The processing device 122 may determine a position of the target scene with respect to each layer of cameras. For example, a position of the target scene with respect to the $i^{th}$ layer of cameras may include an $i^{th}$ deviation direction of the target scene with respect to a reference direction (e.g., the north, the east, the south, the west), an $i^{th}$ deviation angle of the target scene with respect to the reference direction, an $i^{th}$ coordinate of the target scene with respect to the $i^{th}$ layer of cameras, etc. In some embodiments, the processing device 122 may determine a position of the target scene with respect to each camera in the $i^{th}$ layer respectively and designate an average of the determined positions as the position of the target scene with respect to the $i^{th}$ layer of cameras. In some embodiments, the processing device 122 may select, in the $i^{th}$ layer of cameras, one camera nearest to the target scene and designate the position of the target scene with respect to the selected camera as the position of the target scene with respect to the $i^{th}$ layer of cameras.

In some embodiments, the processing device 122 may designate a position of an intersection of an $n^{th}$ deviation direction of the target scene with respect to the reference direction and an $(n-1)^{th}$ deviation direction of the target scene with respect to the reference direction as the position of the target scene. In some embodiments, the processing device 122 may designate an $n^{th}$ coordinate of the target scene with respect to the $n^{th}$ layer of cameras as the position of the target scene.

For illustration purposes, if the at least one camera only includes the first camera, the processing device 122 may designate the first position of the target scene with respect to the first camera as the position of the target scene. If the at least one camera includes the first camera and the at least one second camera, the processing device 122 may designate a position of an intersection between a first deviation direction of the target scene with respect to the reference direction and a second deviation direction of the target scene with respect to the reference direction as the position of the target scene. In some embodiments, the processing device 122 may designate a second coordinate of the target scene with respect to the at least one second camera as the coordinate of the target scene. If the at least one camera includes the first camera, the at least one second camera, and the at least one third camera, the processing device 122 may designate a position of an intersection between the second deviation direction of the target scene with respect to the reference direction and a third deviation direction of the target scene with respect to the reference direction as the position of the target scene. In some embodiments, the processing device 122 may designate a third coordinate of the target scene with respect to the at least one third camera as the coordinate of the target scene.

In 630, the processing device 122 (e.g., the navigation module) (e.g., the processing circuits of the processor 220) may plan a traveling route for a detection equipment (e.g., the detection equipment 160 illustrated in FIG. 1) (e.g., a UAV) to the target scene based on the position of the target scene. In some embodiments, the processing device 122 may plan the traveling route for the detection equipment to the position of the target scene and then navigate the detection equipment to the position of the target scene along the traveling route. In some embodiments, as described in connection with FIG. 1 or operation 530, the accuracy of the position of the target scene determined in 620 may relate to the count of layer(s) of the at least one camera. If the count of the layer(s) of cameras is smaller than a count threshold (e.g., two, three), the accuracy of the position of the target scene determined in 620 may be poor or deemed poor. In order to improve the accuracy of the position of the target scene, the processing device 122 may use visual navigation of the detection equipment (e.g., the UAV) to update the position of the target scene or assist the navigation. The accuracy of the updated position may be higher than the accuracy of the position of the target scene determined in 620. For example, the accuracy of the updated position of the target scene may be larger than or equal to an accuracy threshold.

In some embodiments, the processing device 122 may navigate the detection equipment to an initial position within an FOV of the first camera and then navigate the detection equipment using the visual navigation of the detection equipment until the detection equipment reaches the updated position of the target scene. In some embodiments, the processing device 122 may navigate the detection equipment to the position of the target scene determined in 620 using a global positioning system (GPS) of the detection equipment and then navigate the detection equipment using the visual navigation of the detection equipment until the detection equipment reaches the updated position of the target scene.

Assuming that the count threshold is two and the at least one camera only includes the first camera, the processing device 122 may navigate the detection equipment to the initial position within an FOV of the first camera and then navigate the detection equipment to the updated position of the target scene using the visual navigation of the detection equipment. In some embodiments, the processing device 122 may use the visual navigation of the detection equipment to navigate the detection equipment from the initial position to a position in the first deviation direction and then navigate the detection equipment 720 along the first deviation direction until the detection equipment reaches the updated position of the target scene. For example, the processing device 122 may navigate the detection equipment from the initial position to a position in the first deviation direction along a direction perpendicular to the deviation direction, such that the detection equipment can reach a position in the first deviation direction as soon as possible. As another example, the processing device 122 may navigate the detection equipment from the initial position to the position of the target scene determined in 620 in the first deviation direction.

In some embodiments, the processing device 122 may navigate the detection equipment to the position of the target scene determined in 620 and further navigate the detection equipment using the visual navigation of the detection equipment until the detection equipment reaches the updated position of the target scene. Assuming that the count threshold is two, and the at least one camera includes the first camera and the second camera, the processing device 122 may plan the traveling route for the detection equipment from its current position to the position of the target scene and directly navigate the detection equipment along the planned traveling route.

Assuming that the count threshold is three and the at least one camera includes the first camera or the at least one camera includes the first camera and the at least one second camera, the processing device 122 may navigate the detection equipment to the initial position within an FOV of the first camera and then navigate the detection equipment to the updated position of the target scene using the visual navigation of the detection equipment. In some embodiments, the processing device 122 may navigate the detection equipment to the position of the target scene determined in 620 and further navigate the detection equipment using the visual navigation of the detection equipment until the detection equipment reaches the updated position of the target scene. Assuming that the count threshold is three, and the at least one camera only includes the first camera, the second camera, and the at least one third camera, the processing device 122 may plan the traveling route for the detection equipment from its current position to the position of the target scene and directly navigate the detection equipment along the planned traveling route. More descriptions of planning the traveling route for the detection equipment may be found elsewhere in the present disclosure, for example, FIGS. 7-9 and the descriptions thereof.

As described above, the target scene may be time-dependent, the processing device 122 may update the (updated) position of the target scene and/or the traveling route for the detection equipment at regular or irregular intervals, thereby determining a most updated position of the target scene and/or the traveling route for the detection equipment.

In some embodiments, after the detection equipment reaches the (updated) position of the target scene, the processing device 122 may acquire detailed information of the target scene based on at least one image captured by the detection equipment. Taking a fire disaster as an example, the detailed information may be used to make a plan for extinguishing the fire. Merely by way of example, the detailed information may include a wind direction, order of severity, a surrounding environment of the fire disaster, whether there are people stuck in the fire, etc.

In some embodiments, the processing device 122 may initiate an alert (e.g., repeated beeps, honks, or sirens, flashing, beacons) of the detection equipment to remind persons nearby the target scene. In some embodiments, the detection equipment may carry supplies to the target scene. For example, the supplies may include a fire hydrant, a fire extinguisher, water, food, clothing, medicine, an automatic external defibrillator (AED), etc.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 7:
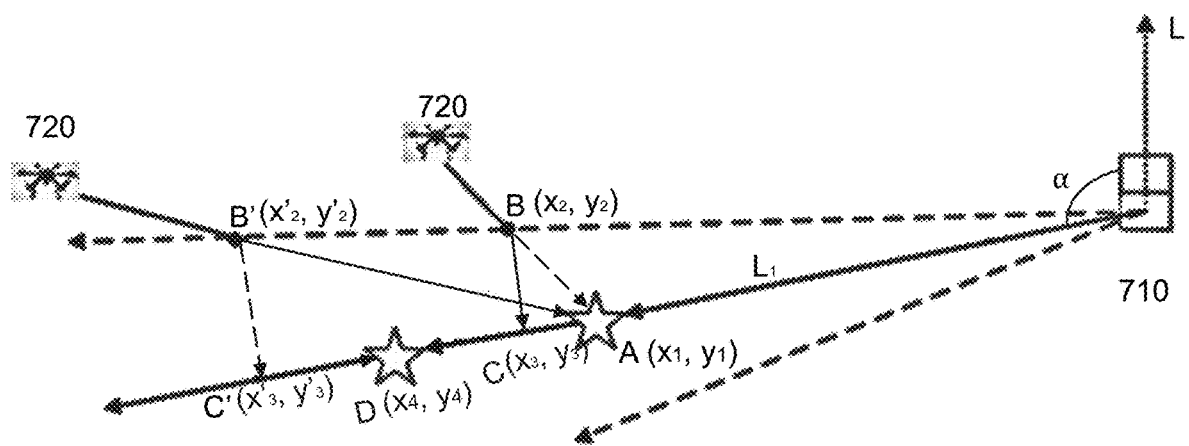
FIG. 7 is a schematic diagram illustrating route planning for a detection equipment according to some embodiments of the present disclosure.

FIG. 7 is a schematic diagram illustrating route planning for a detection equipment according to some embodiments of the present disclosure.

As illustrated in FIG. 7, the positioning system 100 includes a camera 710 and a detection equipment 720 (e.g., a UAV). The processing device 122 determines a position A of a target scene with respect to the camera 710 based on at least one image captured by the camera 710. For example, the position A of the target scene with respect to the camera 710 includes a deviation direction $L_1$, a deviation angle α of the target scene with respect to the reference direction L, or a coordinate $(x_1, y_1)$ of the target scene with respect to the camera 710.

As described in connection with operation 630, the accuracy of the position of the target scene determined based on the at least one camera of the positioning system 100 may relate to the count of the layer(s) of the at least one camera. If the count of the layer(s) of the at least one camera is smaller than the count threshold, the accuracy of the determined position of the target scene may be poor or deemed poor. In order to improve the accuracy of the positioning of the target scene, the processing device 122 may use visual navigation of the detection equipment to update the position of the target scene or assist the navigation. Assuming that the accuracy of the determined position of the target scene is poor or deemed poor, the processing device 122 navigates the detection equipment 720 to a position $B(x_2, y_2)$ or $B'(x_2', y_2')$ that is within an FOV of the camera 710, then navigate, using a visual navigation of the detection equipment 720, the detection equipment 720 to a position (e.g., a position $C(x_3, y_3)$, a position $C'(x_3', y_3')$, the position A) in the first deviation direction $L_1$ and then navigates, using the visual navigation of the detection equipment 720, the detection equipment 720 along the first deviation direction $L_1$ until the detection equipment reaches a position $D(x_4, y_4)$ where the target scene locates. The position $D(x_4,y_4)$ where the target scene locates may be identified by the detection equipment or the processing device 122 according to one or more images captured by the detection equipment. For example, the detection equipment may capture images in real time and transmit those captured images to the processing device 122 via the network 140. Then, the processing device 122 may analyze the one or more images to check whether the target scene appears. If the target scene appears in at least one image captured by the detection equipment, the processing device 122 may calculate the actual position of the target scene and guide the detection equipment towards the actual position of the target scene. As illustrated in FIG. 7, the processing device 122 navigates the detection equipment 720 from $B(x_2,y_2)$ or $B'(x_2',y_2')$ to the position $C(x_3, y_3)$ or $C'(x_3',y_3')$ along a direction perpendicular to the deviation direction $L_1$, such that the detection equipment can reach a position in the first deviation direction $L_1$ as soon as possible.

Figure 8A:
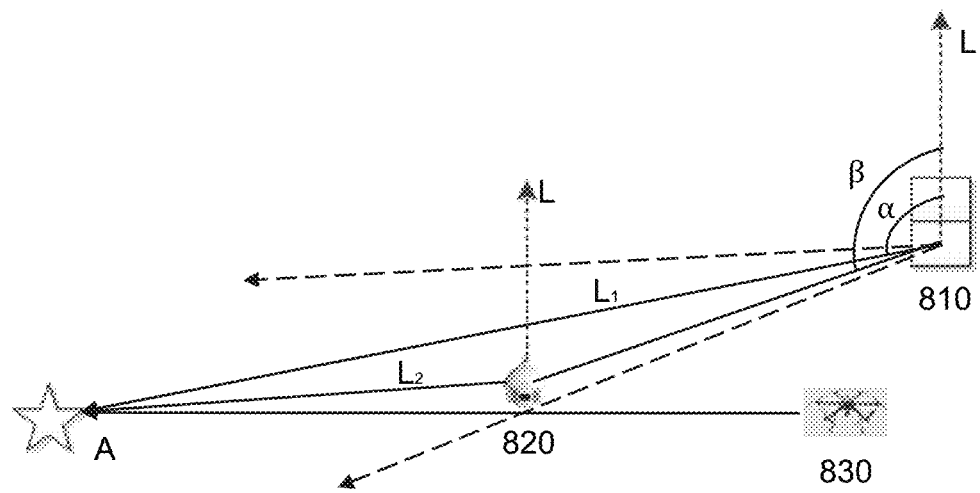
FIGS. 8A and 8B are schematic diagrams illustrating route planning for a detection equipment according to some embodiments of the present disclosure.
Figure 8B:
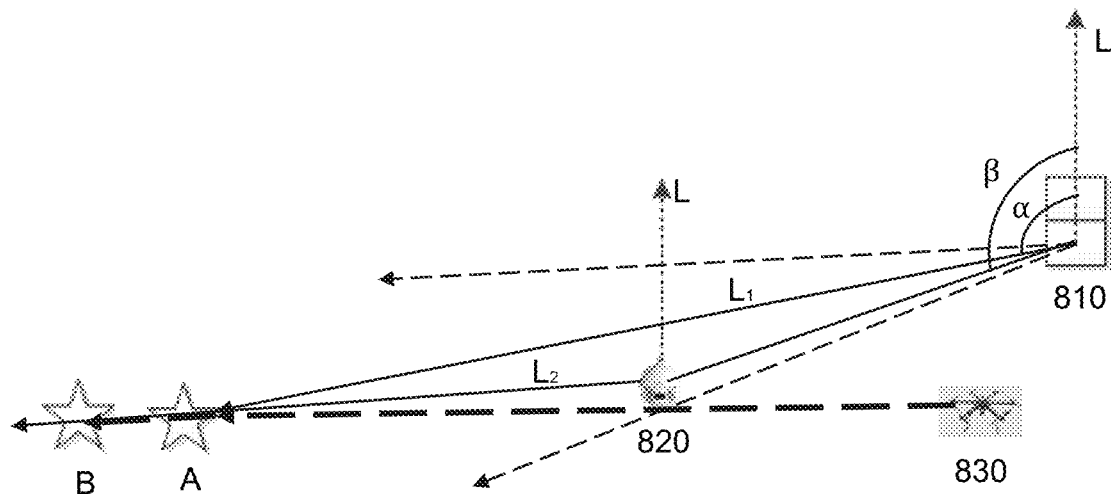

FIGS. 8A and 8B are schematic diagrams illustrating route planning for a detection equipment according to some embodiments of the present disclosure.

As illustrated in FIGS. 8A and 8B, the positioning system 100 includes a first camera 810, a second camera 820, and a detection equipment 830 (e.g., a UAV). The second camera 820 may be within an FOV of the first camera 810. The processing device 122 determines a first position (e.g., a first deviation direction $L_1$) of the target scene with respect to the first camera 810 and determines a second position (e.g., a second deviation direction $L_2$) of the target scene with respect to the second camera 820. The processing device 122 designates a position of an intersection A of the first deviation direction $L_1$ and the second deviation direction $L_2$ as a position of the target scene.

As described in operation 630 or FIG. 7, the accuracy of the position of the target scene determined based on the at least one camera of the positioning system 100 may relate to the count of the layer(s) of the at least one camera. Assuming that the accuracy of the position of the target scene determined based on both of the camera 810 and the camera 820 is high or deemed high, the processing device 122 determines that the target scene is located at the intersection A. Further, as illustrated in FIG. 8A, the processing device 122 plans a traveling route for the detection equipment 830 directly from the current position of the detection equipment 830 to the intersection A.

Assuming that the accuracy of the position of the target scene determined based on both of the camera 810 and the camera 820 is poor or deemed poor, as illustrated in FIG. 8B, the processing device 122 uses visual navigation of the detection equipment 830 to update the determined position of the target scene or assist the navigation. For example, the processing device 122 navigates the detection equipment 830 to the position A and then uses the visual navigation of the detection equipment 830 to the updated position B where the target scene locates such that the detection equipment can accurately reach the target scene.

Figure 9:
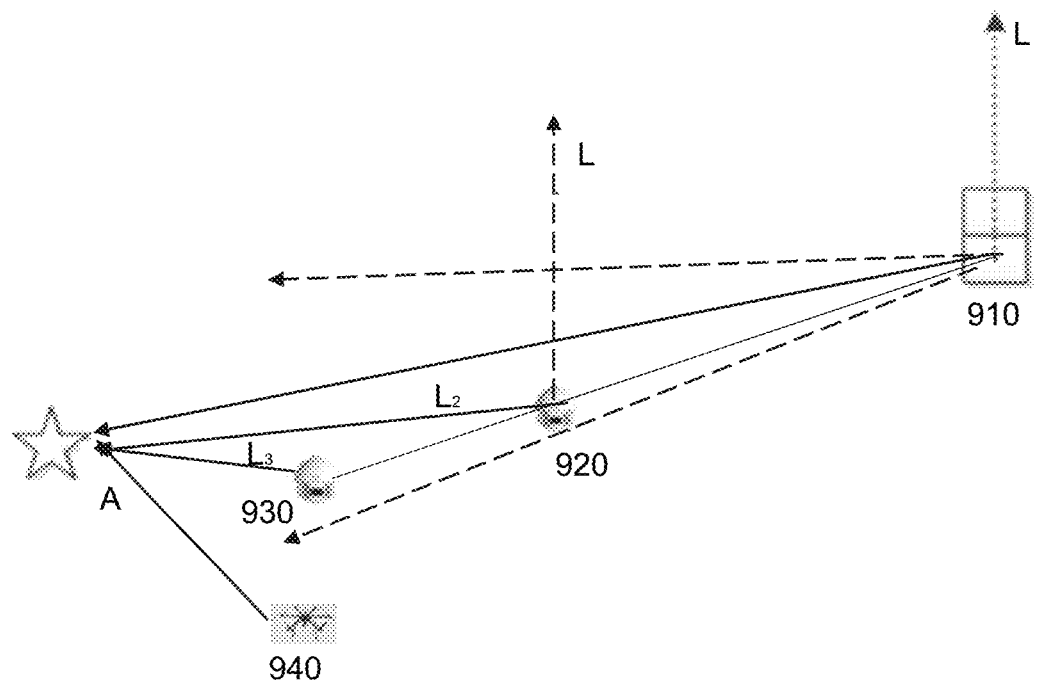
FIG. 9 is a schematic diagram illustrating route planning for a detection equipment according to some embodiments of the present disclosure.

FIG. 9 is a schematic diagram illustrating route planning for a detection equipment according to some embodiments of the present disclosure.

As illustrated in FIG. 9, the positioning system 100 includes a first camera 910, a second camera 920, a third camera 930, and a detection equipment 940 (e.g., a UAV). The second camera 920 is within an FOV of the first camera 910. The third camera 930 is within an FOV of the second camera 920. The processing device 122 determines a second position (e.g., a second deviation direction $L_2$) of a target scene with respect to the second camera 920. The processing device 122 determines a third position (e.g., a third deviation direction $L_3$) of the target scene with respect to the third camera 930. The processing device 122 designates a position of an intersection A of the second deviation direction $L_2$ and the third deviation direction $L_3$ as a position of the target scene.

As described in operation 630 or FIG. 7, the accuracy of the position of the target scene determined based on the at least one camera of the positioning system 100 may relate to the count of the layer(s) of the at least one camera. Assuming that the accuracy of the position of the target scene determined based on the camera 910, the camera 920, and the camera 930 is high or deemed high, the processing device 122 determines that the target scene is located at the intersection A. Further, the processing device 122 plans a travelling route for the detection equipment 940 directly from the current position of the detection equipment 940 to the intersection A.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in smaller than all features of a single foregoing disclosed embodiment.

We claim:

1. A system, comprising:
    at least one storage device including a set of instructions; and
    at least one processor in communication with the at least one storage device via a network, wherein when executing the set of instructions, the at least one processor is configured to cause the system to:
        obtain a first image captured by a first camera and a second image captured by a second camera, both the first image and the second image including a same target scene;
        determine a first position of the target scene with respect to the first camera based on the first image;
        determine a second position of the target scene with respect to the second camera based on the second image;
        determine a position of the target scene based on the first position of the target scene with respect to the first camera and the second position of the target scene with respect to the second camera;
        plan a travelling route for a detection equipment to the target scene based on the position of the target scene;
        navigate, using a global positioning system (GPS) of the detection equipment, the detection equipment from the position of the detection equipment to the position of the target scene along the travelling route; and
        navigate, using visual navigation of the detection equipment, the detection equipment until the detection equipment reaches the target scene.

2. The system of claim 1, wherein
    the first position of the target scene with respect to the first camera includes at least one of a first deviation direction of the target scene with respect to a reference direction, a first deviation angle of the target scene with respect to the reference direction, or a first coordinate of the target scene with respect to the first camera; or
    the second position of the target scene with respect to the second camera includes at least one of a second deviation direction of the target scene with respect to the reference direction, a second deviation angle of the target scene with respect to the reference direction, or a second coordinate of the target scene with respect to the second camera.

3. The system of claim 2, wherein to determine a position of the target scene based on the first position of the target scene with respect to the first camera and the second position of the target scene with respect to the second camera, the at least one processor is configured to cause the system to:
    determine an intersection of the first deviation direction and the second deviation direction; and
    designate a position of the intersection as the position of the target scene.

4. The system of claim 2, wherein to determine a position of the target scene based on the first position of the target scene with respect to the first camera and the second position of the target scene with respect to the second camera, the at least one processor is configured to cause the system to:
    designate the second coordinate of the target scene with respect to the second camera as a coordinate of the target scene.

5. The system of claim 1, wherein to determine a position of the target scene based on the first position of the target scene with respect to the first camera and the second position of the target scene with respect to the second camera, the at least one processor is configured to cause the system to:

determine, based on the first position and the second position, the position of the target scene using the visual navigation of the detection equipment.

6. A method implemented on a computing device including at least one processor, at least one storage medium, and a communication platform connected to a network, the method comprising:
 obtaining a first image captured by a first camera and a second image captured by a second camera, both the first image and the second image including a same target scene;
 determining a first position of the target scene with respect to the first camera based on the first image;
 determining a second position of the target scene with respect to the second camera based on the second image;
 determining a position of the target scene based on the first position of the target scene with respect to the first camera and the second position of the target scene with respect to the second camera;
 planning a travelling route for a detection equipment to the target scene based on the position of the target scene;
 navigating, using a global positioning system (GPS) of the detection equipment, the detection equipment from the position of the detection equipment to the position of the target scene along the travelling route; and
 navigating, using visual navigation of the detection equipment, the detection equipment until the detection equipment reaches the target scene.

7. A system, comprising:
 at least one storage device including a set of instructions; and
 at least one processor in communication with the at least one storage device via a network, wherein when executing the set of instructions, the at least one processor is configured to cause the system to:
  obtain, via at least one camera, at least one image, the at least one image including a target scene, wherein the at least one image includes at least one first image obtained via a first camera of the at least one camera;
  determine, based on the at least one image, a position of the target scene; and
  plan, based on the position of the target scene, a travelling route for a detection equipment to the target scene by:
   determining whether the at least one camera includes at least one second camera within a field of view (FOV) of the first camera and being able to capture the target scene;
   in response to determining that the at least one camera does not include the second camera, determining the travelling route for the detection equipment from a position of the detection equipment to the position of the target scene;
   navigating, using a global positioning system (GPS) of the detection equipment, the detection equipment from the position of the detection equipment to the position of the target scene along the travelling route; and
   navigating, using visual navigation of the detection equipment, the detection equipment until the detection equipment reaches the target scene.

8. The system of claim 7, wherein to obtain, via at least one camera, at least one image, the at least one processor is directed to:
 in response to determining that the at least one camera includes the at least one second camera, obtain, via the at least one second camera, at least one second image including the target scene.

9. The system of claim 8, wherein
 the at least one second camera is nearer to the target scene than the first camera.

10. The system of claim 8, wherein to determine, based on the at least one image, a position of the target scene, the at least one processor is directed to:
 determine, based on the at least one first image, a first position of the target scene with respect to the first camera;
 determine, based on the at least one second image, a second position of the target scene with respect to the at least one second camera; and
 determine, based on the first position of the target scene with respect to the first camera and the second position of the target scene with respect to the at least one second camera, the position of the target scene.

11. The system of claim 10, wherein
 the first position of the target scene with respect to the first camera includes a first deviation direction of the target scene with respect to a reference direction, a first deviation angle of the target scene with respect to the reference direction, or a first coordinate of the target scene with respect to the first camera; or
 the second position of the target scene with respect to the second camera includes at least one of a second deviation direction of the target scene with respect to the reference direction, a second deviation angle of the target scene with respect to the reference direction, or a second coordinate of the target scene with respect to the second camera.

12. The system of claim 8, wherein the at least one second camera is rotatable.

13. The system of claim 7, wherein the at least one processor is directed further to:
 acquire, via the detection equipment, detailed information of the target scene.

14. The system of claim 7, wherein the target scene includes at least one of fire disaster, toxic gas, leaked oil, a traffic accident, a suspicious object, or a scene that a person has an unusual behavior.

15. The system of claim 7, wherein the at least one camera or the detection equipment communicates with the at least one processor via a 5G network.

16. The system of claim 7, wherein the first camera includes an omnidirectional camera.

17. The system of claim 7, wherein the detection equipment includes an unmanned aerial vehicle.

* * * * *